US009164185B2

(12) United States Patent
Coste et al.

(10) Patent No.: US 9,164,185 B2
(45) Date of Patent: Oct. 20, 2015

(54) NEAR-SIMULTANEOUS ACQUISITION FOR BOREHOLE SEISMIC

(75) Inventors: Emmanuel Coste, Oslo (NO); John Richard Tulett, Yokohama (JP); Jitendra S Gulati, Houston, TX (US); Walter Scott Leaney, Katy, TX (US); Jakob Haldorsen, Nesbru (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 1005 days.

(21) Appl. No.: 13/180,442

(22) Filed: Jul. 11, 2011

(65) Prior Publication Data

US 2012/0008459 A1 Jan. 12, 2012

Related U.S. Application Data

(60) Provisional application No. 61/363,596, filed on Jul. 12, 2010, provisional application No. 61/382,497, filed on Sep. 14, 2010.

(51) Int. Cl.
*G01V 1/38* (2006.01)
*G01V 1/00* (2006.01)
*G01V 1/42* (2006.01)

(52) U.S. Cl.
CPC ........ *G01V 1/005* (2013.01); *G01V 1/42* (2013.01); *G01V 1/38* (2013.01); *G01V 2210/3246* (2013.01)

(58) Field of Classification Search
CPC ......... G01V 1/003; G01V 1/005; G01V 1/42; G01V 1/3808; G01V 1/3835; G01V 2210/3246; G01V 1/38; E21B 21/001; E21B 21/08; E21B 21/10; F16K 7/04

USPC ........... 181/110, 112; 251/4, 5, 63.4; 367/15, 367/21, 23, 25, 57, 58
See application file for complete search history.

(56) References Cited

U.S. PATENT DOCUMENTS

| | | | | |
|---|---|---|---|---|
| 4,709,900 A | * | 12/1987 | Dyhr | 251/5 |
| 4,894,807 A | * | 1/1990 | Alam et al. | 367/15 |
| 4,965,773 A | * | 10/1990 | Marschall | 367/15 |

(Continued)

FOREIGN PATENT DOCUMENTS

| | | |
|---|---|---|
| GB | 2390902 | 1/2004 |
| GB | 2404442 | 2/2005 |

OTHER PUBLICATIONS

"Dither," Wikipedia, 2013, downloaded Oct. 20, 2013 from http://en.wikipedia.org/wiki/Dither, pp. 1-15.*

(Continued)

*Primary Examiner* — Daniel L Murphy
(74) *Attorney, Agent, or Firm* — Daryl R. Wright; Jody DeStefanis

(57) ABSTRACT

A technique facilitates performance of seismic profiling, such as three-dimensional vertical seismic profiling. A downhole acquisition system is provided with acoustic receivers designed to receive acoustic source signals. The firing of acoustic source signals is synchronized with the downhole acquisition system. Additionally, the firing of two or more acoustic source signals is controlled to provide simultaneous or nearly simultaneous timing of one acoustic source signal with respect to another acoustic source signal. A processing system is used to acquire and process a data stream of the initial shot and a data stream of the additional shot occurring simultaneously or nearly simultaneously.

17 Claims, 9 Drawing Sheets

(56) References Cited

U.S. PATENT DOCUMENTS

| | | | |
|---|---|---|---|
| 5,924,049 | A | 7/1999 | Beasley et al. |
| 6,545,944 | B2 | 4/2003 | de Kok |
| 2005/0128874 | A1 | 6/2005 | Herkenhoff et al. |
| 2008/0205191 | A1 | 8/2008 | Coste et al. |
| 2009/0032369 | A1 | 2/2009 | Berdelle-Hilge et al. |
| 2009/0032685 | A1 | 2/2009 | Rhodes |
| 2010/0014381 | A1 | 1/2010 | Beasley et al. |
| 2010/0039897 | A1 | 2/2010 | Beasley |
| 2010/0085836 | A1 | 4/2010 | Bagaini et al. |
| 2010/0097885 | A1 | 4/2010 | Moore |
| 2010/0161235 | A1 | 6/2010 | Ikelle |
| 2010/0254220 | A1 | 10/2010 | Tulett et al. |
| 2010/0271904 | A1 | 10/2010 | Moore et al. |
| 2011/0158044 | A1 | 6/2011 | Moldoveanu et al. |

OTHER PUBLICATIONS

"Dither," Wikipedia, 2009. downloaded May 31, 2014 from Internet Archive, https://web.archive.org/web/20090109031013/http://en.wikipedia.org/wiki/Dither, pp. 1-12.*

Ian Moore, et al., "Simultaneous source separation using dithered sources", SEG Las Vegas 2008, Annual Meeting., Jan. 1, 2008, pp. 2806-2810.

J.S. Gulati, et al., "Faster 3D VSP acquisition using simultaneous sources," SEG San Antonio 2011 Annual Meeting, pp. 4249-4252.

J. Stefani, et al., "Acquisition Using Simultaneous Sources," EAGE 69th Conference, Jun. 2007.

* cited by examiner

SINGLE SOURCE CONFIGURATION

DUAL SOURCE CONFIGURATION

NEAR-SIMULTANEOUS ACQUISITION FOR BOREHOLE SEISMIC

CROSS-REFERENCE TO RELATED APPLICATION

The present document is based on and claims priority to U.S. Provisional Application Ser. No. 61/363,596, filed Jul. 12, 2010, titled "Simultaneous or Dithered Multiple Source Shooting in Rings for Efficient 3D VSP Acquisition", and incorporated herein for all purposes by reference, and to U.S. Provisional Application Ser. No. 61/382,497, filed Sep. 14, 2010, titled "Method and System for Simultaneous or Near-Simultaneous Acquisition for Borehole Seismic", and incorporated herein for all purposes by reference.

BACKGROUND

1. Field of the Invention

Embodiments of the present disclosure relate generally to methods and systems for simultaneous or near-simultaneous acquisition for borehole seismic in oilfield or related applications. However, identification of an exemplary field is for the purpose of simplifying the detailed description and should not be construed as a limitation. Various embodiments of the concepts presented herein may be applied to a wide range of applications and fields as appropriate.

2. Description of the Related Art

The following descriptions and examples are not admitted to be prior art by virtue of their inclusion in this section.

Hydrocarbon fluids such as oil and natural gas are obtained from a subterranean geologic formation, referred to as a reservoir, by drilling a well that penetrates the hydrocarbon-bearing formation. Knowing where the reservoir is located or the type of geological formation containing the reservoir is valuable in determining where to drill and in deciding what well servicing treatments may be needed to efficiently produce a reservoir. One method of mapping the area around a borehole uses acoustic source signals and acoustic receivers.

As the acoustic signals travel through the geological formations, their profiles are altered and then received by the acoustic receivers. By processing the waveforms and acoustic signals detected by the receivers, a representative indication of the location, composition, and extent of various geological formations may be obtained. The acoustic signals may include both sonic and seismic signals. An example of such systems is Schlumberger's VSI (Versatile Seismic Imager).

An acoustic system comprising acoustic sources and receivers may be configured to produce a 3D VSP (three-dimensional vertical seismic profile). To produce a 3D VSP surrounding a borehole, a large number of datasets must be produced and analyzed. For example, in a marine system, a boat or other vessel towing an acoustic source array may move in proximity to a rig in an ever expanding pattern, initiating source signals as the boat travels. The acoustic receivers may be located in a borehole located below the rig. However, this technique may take days to complete. Since rig time is typically measured in hours, the costs to perform a full 3D VSP can be quite substantial.

SUMMARY

In general, embodiments of the present disclosure may provide a technique which facilitates the performance of seismic profiling, such as three-dimensional vertical seismic profiling. A downhole acquisition system may be provided with acoustic receivers designed to receive acoustic source signals. The firing of acoustic source signals may be synchronized with the downhole acquisition system. Additionally, the firing of two or more acoustic source signals may be controlled to provide simultaneous or nearly simultaneous timing of one acoustic source signal with respect to another acoustic source signal. A processing system may be used to acquire and process a data stream of the initial shot and a data stream of the additional shot occurring simultaneously or nearly simultaneously.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
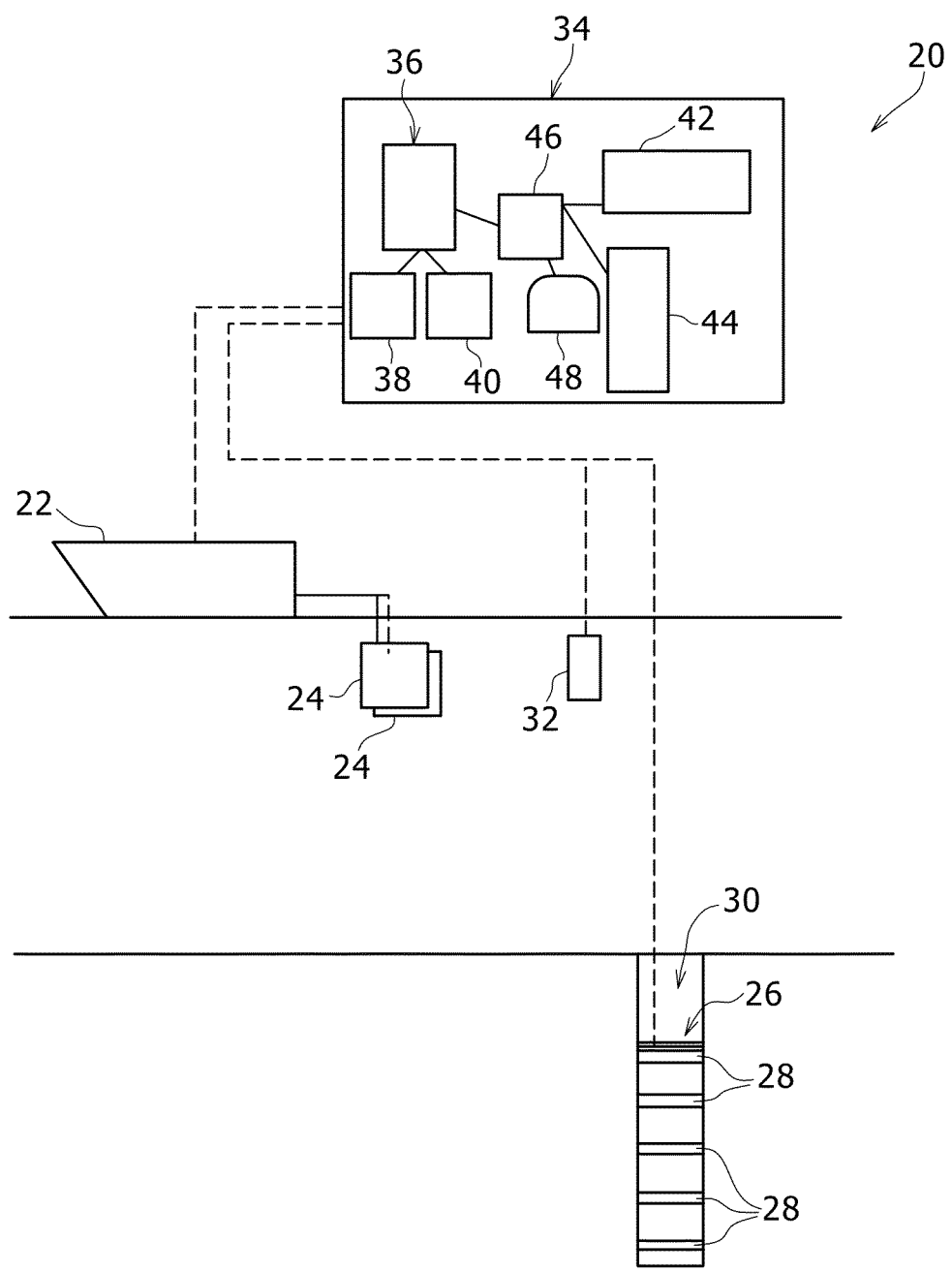
FIG. 1 is a schematic illustration of an example of a seismic imaging system, according to an embodiment of the present disclosure.

In the following description, numerous details are set forth to provide an understanding of the embodiments of the present disclosure. However, it will be understood by those of ordinary skill in the art that other embodiments may be practiced without these details and that numerous variations or modifications from the described embodiments may be possible. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures.

The sensing systems herein may be incorporated in tool systems such as wireline logging tools, measurement-while-drilling and logging-while-drilling tools, permanent monitoring systems, drill bits, drill collars, sondes; among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment of this disclosure.

Embodiments described herein comprise systems and methodologies for performing seismic profiling, such as three-dimensional vertical seismic profiling. For example, a system may comprise a vessel including two or more source arrays which generate acoustic source signals and a downhole acquisition system comprising acoustic receivers configured to receive the source signals and to generate data streams. In addition, the system may comprise a navigation system designed to determine a real time speed, position, and direction of the vessel and to estimate an initial shot time. The system also may comprise a source controller to control firing of acoustic source signals so that timing of an additional shot time is based on the initial shot time plus a dither value. Further, the system may comprise a synchronization unit configured to coordinate the firing of dithered acoustic signals with recording by the downhole acquisition system. A processor may be employed to separate a data stream of the initial shot and a data stream of the additional shot via, for example, a coherency filter.

The system and methodology described herein utilize synchronization of sources with a downhole acquisition system. However, the overall system and methodology may comprise a variety of forms and structures. For example, the synchronization of sources with a downhole acquisition system may be implemented in a three-dimensional vertical seismic profiling, but it also may be implemented with a system utilizing walkaway lines or a system utilizing rig/offset vertical seismic profiling. As discussed in greater detail below, the system also may be designed to utilize positive, negative, or zero dithers to achieve near-simultaneous or pure simultaneous acquisition.

Referring generally to FIG. 1, a schematic illustration is provided of a seismic system 20 used to perform seismic profiling, e.g. three-dimensional vertical seismic profiling or other types of seismic profiling as described below. In this embodiment, a tow vessel 22 is illustrated as towing two or more sources/source arrays 24. Each of the two or more source arrays 24 generates acoustic source signals which are reflected off a subsea boundary and received by a downhole acquisition system 26. The downhole acquisition system 26 comprises at least one and often a plurality of acoustic receivers 28 which are designed to receive source signals and to generate data streams. By way of example, the acoustic receivers 28 are deployed in a borehole 30. In some applications, the downhole acquisition system 26 may be combined with one or more additional acoustic receivers 32 deployed below a rig or at another suitable location to help determine, for example, noise/ghosts in the seismic signal data.

Additionally, the illustrated seismic system 20 may comprise a seismic profiling control system 34 in communication with tow vessel 22 and downhole acquisition system 26. In some embodiments, at least portions of control system 34 are located on the vessel 22. In the embodiment illustrated, control system 34 comprises a navigation system 36 that is designed to determine a real-time speed, position, and direction of the tow vessel 22. The navigation system 36 also enables estimation of an initial shot time with respect to source arrays 24. By way of example, the navigation system 36 may comprise a global positioning system (GPS) 38 and a coordinated universal time (UTC) system 40. The seismic profiling control system 34 also may comprise a source controller 42, which cooperates with navigation system 36 to control firing of acoustic source signals in a manner which includes controlling timing of an additional shot time in a simultaneous or near-simultaneous manner. In some applications, the seismic profiling control system 34 controls firing of acoustic source signals so as to implement timing of the additional shot time based on the initial shot time plus a dither value.

The control system 34 also may comprise a synchronization unit 44 that is configured to coordinate the firing of dithered acoustic signals with recording of the acoustic signals by the downhole acquisition system 26. A processing system 46 having a suitable processor may be coupled to navigation system 36, source controller 42, and synchronization unit 44 to perform various data processing functions, including separating a data stream of the initial shot and a data stream of the additional shot utilizing a dither value. The separation of data may be facilitated via a coherency filter 48.

The configuration of seismic profiling control system 34 may vary depending on the characteristics of the seismic profiling application and/or the overall design of seismic system 20. For example, components of control system 34 may be located on tow vessel or vessels 22, on a rig, in borehole 30, at remote locations, or split between one or more of these locations and/or a variety of other suitable locations. It should be noted that some applications may utilize pure simultaneous acquisition rather than using a dither value. Thus, some applications do not separate the data stream of the shot and the data stream of the additional shot.

Figure 2:
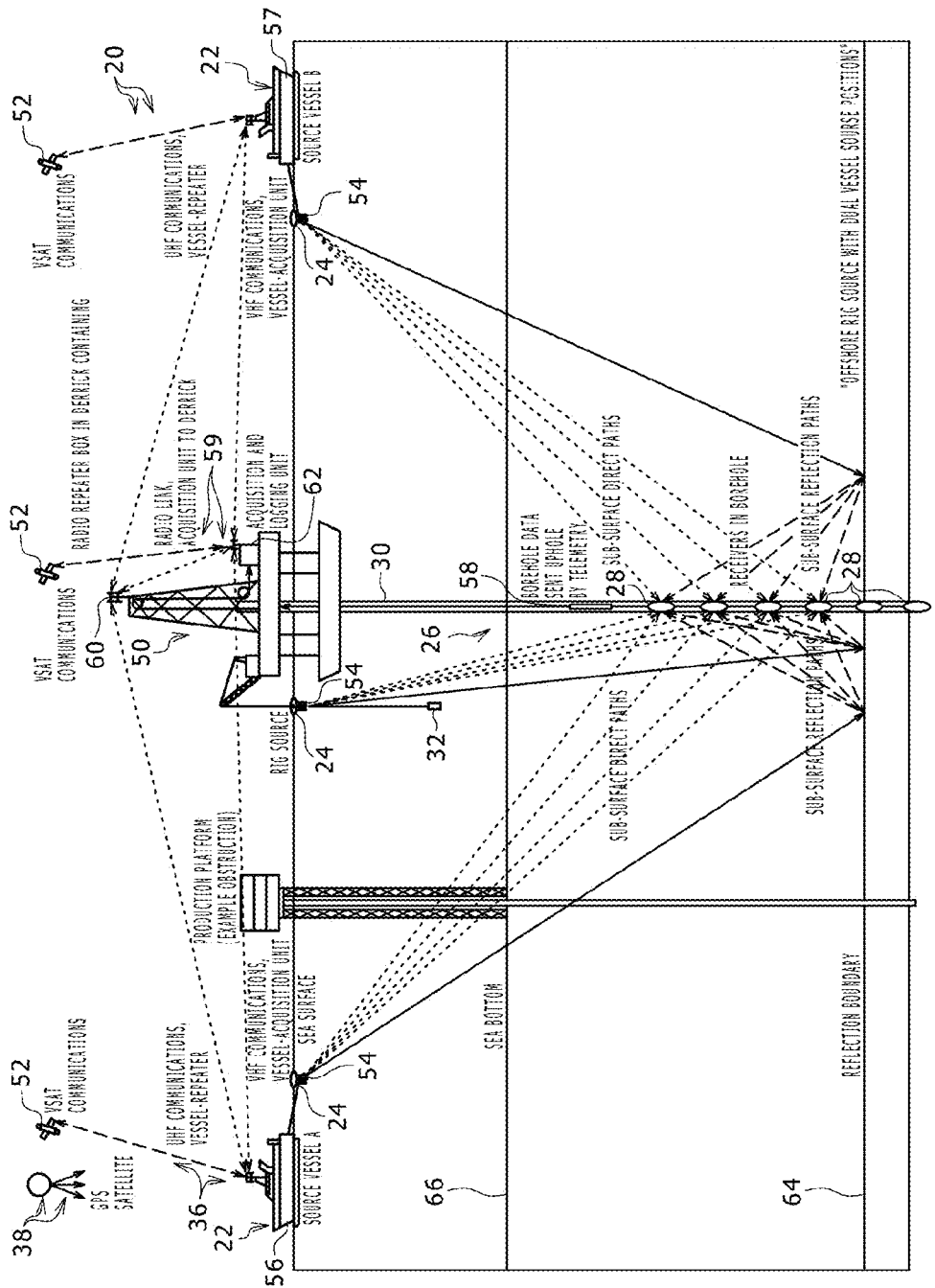
FIG. 2 is a schematic illustration of an example of the seismic imaging system comprising a plurality of vessels, according to an embodiment of the present disclosure.

Referring generally to FIG. 2, an embodiment of seismic system 20 is illustrated in which a plurality of tow vessels 22 is employed to enable the seismic profiling, e.g. three-dimensional vertical seismic profiling or rig/offset vertical seismic profiling. In FIG. 2, a marine system is illustrated as including a rig 50, a plurality of vessels 22, and one or more acoustic receivers 28. Although a marine system is illustrated, other embodiments of the disclosure may not be limited to this example. A person of ordinary skill in the art will recognize that teachings of the disclosure may be used in land or offshore systems. However, offshore systems are described herein to simplify the disclosure and to facilitate explanation.

Although two vessels 22 are illustrated in FIG. 2, a single vessel 22 with multiple source arrays 24 or multiple vessels 22 each with single or multiple sources 24 may be used. In some applications, at least one source/source array 24 may be located on the rig 50 as represented by the rig source in FIG. 2. As the vessels 22 travel on predetermined or systematic paths, their locations may be recorded through the use of navigation system 36. In some cases, the navigation system 36 utilizes a global positioning system (GPS) 38 to record the position, speed, direction, and other parameters of the tow vessels 22.

As illustrated, the global positioning system 38 may utilize or work in cooperation with satellites 52 which operate on a suitable communication protocol, e.g. VSAT communications. The VSAT communications may be used, among other things, to supplement VHF and UHF communications. The GPS information can be independent of the VSAT communications and may be input to processing system 46 or other suitable processors to predict the future movement and position of the vessels 22 based on real-time information. In addition to predicting future movements, the processing system 46 also can be utilized to provide directions and coordinates as well as to determine initial shot times, as described above. Control system 34 effectively utilizes processing system 46 in cooperation with source controller 42 and synchronization unit 44 to synchronize the sources 24 with the downhole data acquisition system 26.

As illustrated, the one or more vessels 22 each tow one or more acoustic sources/source arrays 24. The source arrays 24 include one or more seismic signal generators 54, e.g. air guns, configured to create a seismic/sonic disturbance. In the embodiment illustrated, the tow vessels 22 comprise a master source vessel 56 (Vessel A) and a slave source vessel 57 (Vessel B). However, other numbers and arrangements of tow vessels 22 may be employed to accommodate the parameters of a given seismic profiling application. For example, one source 24 may be mounted at rig 50 (see FIG. 2) or at another suitable location, and both vessels 22 may serve as slave vessels with respect to the rig source 24 or with respect to a source at another location.

However, a variety of source arrangements and implementations may be provided as desired for a given application. When utilizing dithered timing between the sources, for example, the master and slave locations of the sources can be adjusted according to the parameters of the specific seismic profiling application. In some applications, one of the source vessels 22 (e.g. source vessel A in FIG. 2) may serve as the master source vessel while the other source vessel 22 serves as the slave source vessel with dithered firing. However, an alternate source vessel 22 (e.g. source vessel B in FIG. 2) may serve as the master source vessel while the other source vessel 22 serves as the slave source vessel with dithered firing.

Similarly, the rig source 22 may serve as the master source while one of the source vessels 22 (e.g. vessel A) serves as the slave source vessel with dithered firing. The rig source 22 also may serve as the master source while the other source vessel 22 (e.g. vessel B) serves as the slave source vessel with dithered firing. In some applications, the rig source 22 may serve as the master source while both of the source vessels 22 serve as slave source vessels each with dithered firings. These and other arrangements may be used in achieving the desired synchronization of sources 22 with the downhole acquisition system 26.

The acoustic receivers 28 of data acquisition system 26 may be deployed in borehole 30 via a variety of delivery systems, such as wireline delivery systems, slickline delivery systems, and other suitable delivery systems. Although a single acoustic receiver 28 could be used in the borehole 30, the illustrated embodiment comprises a plurality of receivers 28 that may be located in a variety of positions and orientations. The acoustic receivers 28 may be configured for sonic and/or seismic reception. Additionally, the acoustic receivers 28 may be communicatively coupled with processing equipment 58 located downhole. By way of example, processing equipment 58 may comprise a telemetry system for transmitting data from acoustic receivers 28 to additional processing equipment 59 located at the surface, e.g. on the rig 50 and/or vessels 22.

Depending on the specifics of a given data communication system, examples of surface processing equipment 59 may comprise a radio repeater 60, an acquisition and logging unit 62, and a variety of other and/or additional signal transfer components and signal processing components. The radio repeater 60 along with other components of processing equipment 59 may be used to communicate signals, e.g. UHF and/or VHF signals, between vessels 22 and rig 50 and to enable further communication with downhole data acquisition system 26.

It should be noted the UHF and VHF signals can be used to supplement each other. In general, the UHF band supports a higher data rate throughput but can be susceptible to obstructions and has less range. The VHF band is less susceptible to obstructions and has increased radio range but its data rate throughput is lower. In FIG. 2, for example, the VHF communications are illustrated as "punching through" an obstruction in the form of a production platform.

In some applications, the acoustic receivers 28 are coupled to surface processing equipment 59 via a hardwired connection. In other embodiments, wireless or optical connections may be employed. In still other embodiments, combinations of coupling techniques may be employed to relay information received downhole via the acoustic receivers 28 to an operator and/or control system, e.g. control system 34, located at least in part at the surface.

In addition to providing raw or processed data uphole to the surface, the coupling system, e.g. downhole processing equipment 58 and surface processing equipment 59, may be designed to transmit data or instructions downhole to the acoustic receivers 28. For example, the surface processing equipment 59 may comprise synchronization unit 42 which coordinates the firing of sources 24, e.g. dithered (delayed) source arrays, with the acoustic receivers 28 located in borehole 30. According to one embodiment, the synchronization unit 42 uses coordinated universal time to ensure accurate timing. In some cases, the coordinated universal time system 40 is employed in cooperation with global positioning system 38 to obtain UTC data from the GPS receivers of GPS system 38.

FIG. 2 illustrates one example of a system for performing seismic profiling that can employ simultaneous or near-simultaneous acquisition of seismic data. By way of example, the seismic profiling may comprise three-dimensional vertical seismic profiling but other applications may utilize rig/offset vertical seismic profiling or seismic profiling employing walkaway lines. An offset source can be provided by a source 24 located on rig 50, on a stationary vessel 22, and/or on another stationary vessel or structure.

As an example, the overall seismic system 20 may employ various arrangements of sources 24 on vessels 22 and/or rig 50 with each location having at least one source/source array 24 to generate acoustic source signals. The acoustic receivers 28 of downhole acquisition system 26 are configured to receive the source signals, at least some of which are reflected off a reflection boundary 64 located beneath a sea bottom 66. The acoustic receivers 28 generate data streams that are relayed uphole to a suitable processing system, e.g. processing system 46, via downhole telemetry/processing equipment 58.

While the acoustic receivers 28 generate data streams, the navigation system 36 determines a real-time speed, position, and direction of each vessel 22 and also estimates initial shot times accomplished via signal generators 54 of the appropriate source arrays 24. The source controller 42 may be part of surface processing equipment 59 (located on rig 50, on vessels 22, or at other suitable locations) and is designed to control firing of the acoustic source signals so that the timing of an additional shot time (e.g. a shot time via slave vessel 57) is based on the initial shot time (e.g. a shot time via master vessel 56) plus a dither value.

The synchronization unit 44 of, for example, surface processing equipment 59, coordinates the firing of dithered acoustic signals with recording of acoustic signals by the downhole acquisition system 26. Processor system 46 is configured to separate a data stream of the initial shot and a data stream of the additional shot via the coherency filter 48. As discussed above, however, other embodiments may employ pure simultaneous acquisition and/or may not require separation of the data streams. In such cases, the dither is effectively zero.

After an initial shot time at T=0 (T0) is determined, subsequent firings of acoustic source arrays 24 may be offset by a dither. The dithers can be positive or negative and sometimes are created as pre-defined random delays. Use of dithers facilitates the separation of simultaneous or near-simultaneous data sets to simplify the data processing. The ability to have the acoustic source arrays 24 fire in simultaneous or near-simultaneous patterns significantly reduces the overall amount of time required for three-dimensional vertical seismic profiling source acquisition. This, in turn, significantly reduces rig time. As a result, the overall cost of the seismic operation is reduced, rendering the data intensive process much more accessible.

If the acoustic source arrays used in the seismic data acquisition are widely separated, the difference in move-outs across the acoustic receiver array of the wave fields generated by the acoustic sources 24 can be sufficient to obtain a clean data image via processing the data without further special considerations. However, even when the acoustic sources 24 are substantially co-located in time, data acquired by any of the methods involving dithering of the firing times of the individual sources 24 described herein can be processed to a formation image leaving hardly any artifacts in the final image. This is accomplished by taking advantage of the incoherence of the data generated by one acoustic source 24 when seen in the reference time of the other acoustic source 24.

Figure 3:
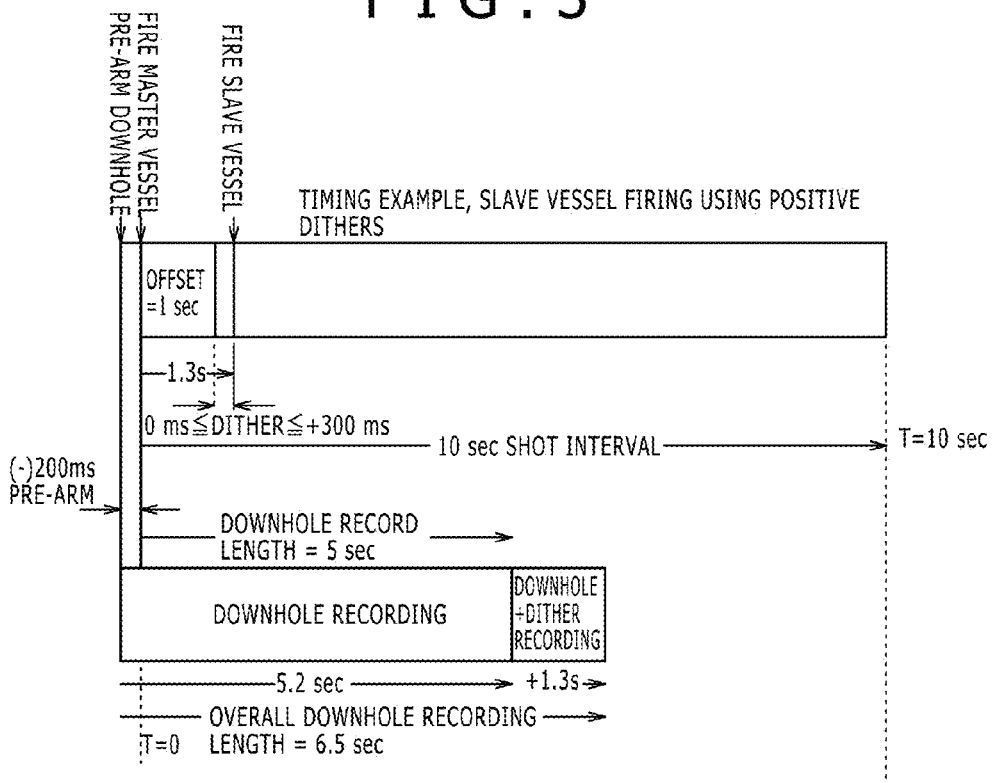
FIG. 3 is a graphical representation of the use of positive dithers during seismic imaging, according to an embodiment of the present disclosure.
Figure 4:
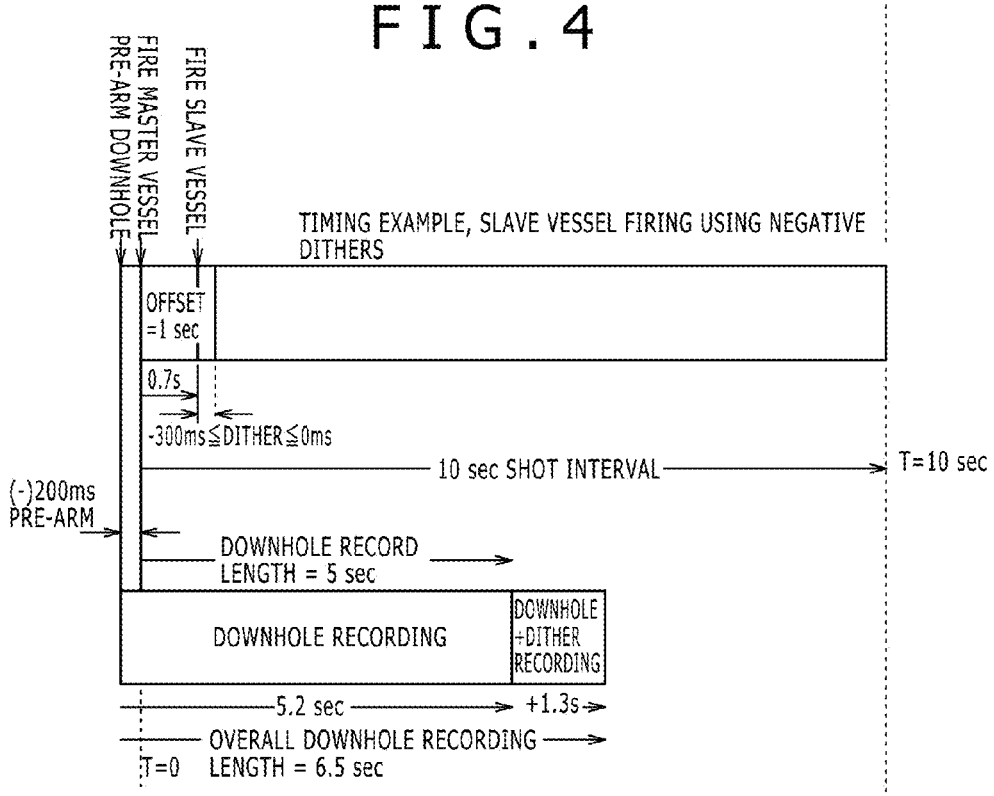
FIG. 4 is a graphical representation of the use of negative dithers during seismic imaging, according to an embodiment of the present disclosure.

Referring generally to FIGS. 3 and 4, graphical representations are provided to illustrate the use of dithered firing of acoustic sources 24. In this example, the dithered firing is accomplished via slave source vessel 57 which may be employed to shoot simultaneously or near-simultaneously with the master vessel 56, e.g. with delays (dithers) as long as, for example, 1.3 seconds. In one example, a shot cycle time of 10 seconds including dithers is employed. By way of example, the vessel speed may be approximately 5 knots and the distance between shots of the seismic sources 24 may be approximately 25 meters. It should be noted that these values are provided only as an example and that other values may be employed for other seismic profiling applications. Also, either or both the master source and the slave source may be located on structures other than vessels 22. For example, the master source 24 or the slave source 24 could be located on rig 50 when offset/rig vertical seismic profiling is desired.

In FIG. 3, the use of a positive dither is illustrated. In this example, the acoustic source or sources 24 of the master vessel 56 is initially fired at time T=0. In some applications, the surface processing equipment 59 comprises a tool (e.g. a VSI "Vertical Seismic Imager" tool available from Schlumberger Corporation) to acquire downhole data, and the firing time T=0 occurs after a brief pre-arm period for the tool, as illustrated. The acoustic source or sources 24 of the slave vessel 57 has a firing offset of 1 second with a positive dither up to 300 ms within a 10 second shot interval. These values, however, may be altered to enable different offsets, dithers, shot intervals, etc. to accommodate environmental and/or application changes. As illustrated, the tool to acquire downhole data, e.g. the VSI tool, is set to record a desired length of time which includes the allocation of a dither recording period.

In the example illustrated in FIG. 4, the use of a negative dither is graphically displayed. In this example, the same values provided in FIG. 3 are used to facilitate explanation; however other values may be used in other applications. In this latter example, the acoustic source or sources 24 of the slave vessel 57 is again fired with an offset of 1 second but with a negative dither between 0 and −300 ms. In other words, the first example provides positive dithers having a 1 second offset plus 0 ms to 300 ms dither (i.e. 1000 ms to 1300 ms). The latter example provides negative dithers having a 1 second offset minus 0 ms to 300 ms dither (i.e. 700 ms to 1000 ms).

Regardless of the specific values employed, the use of positive or negative dithering and near-simultaneous firing enables more shots to be fired in the same period of time. For example, two shots can be acquired during the time it normally takes to acquire one shot, and this ability substantially reduces rig time. As described above, with two sources positioned at separate locations, e.g. master vessel 56 and slave vessel 57 positioned at separate locations, the first source 24 is fired at time equals zero. The second source 24 (which may be the seismic source 24 on slave vessel 57) is then fired in a near-simultaneous manner with a small, pre-determined random time delay (dither) relative to the first source 24.

Figure 5:
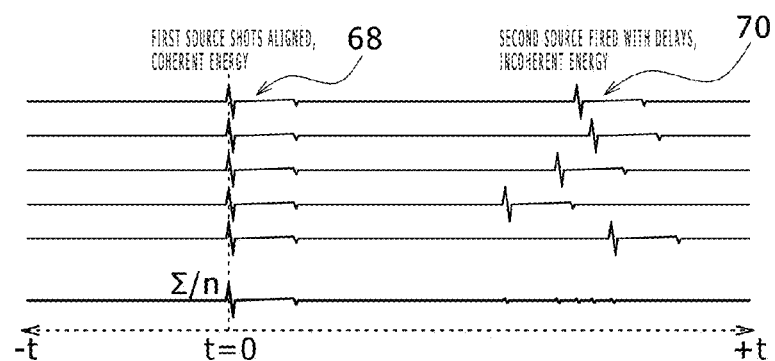
FIG. 5 is a graphical representation of the firing of first and second seismic sources in which the first source shots are aligned and the second source shots are fired with delays, according to an embodiment of the present disclosure.
Figure 6:
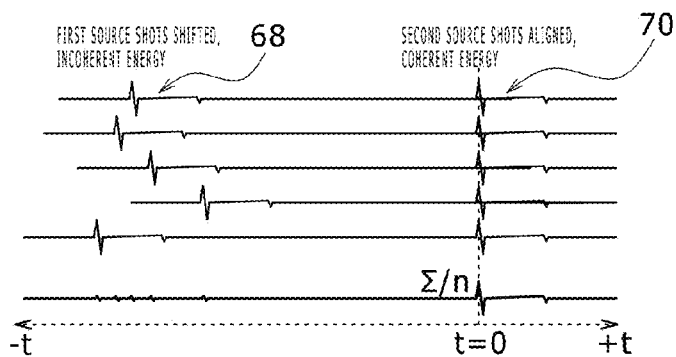
FIG. 6 is a graphical representation of the firing of first and second seismic sources in which the first source shots are shifted and the second source shots are aligned, according to an embodiment of the present disclosure.

As illustrated in FIG. 5, the first source shots may be time aligned so the first shots have coherent energy, as represented by first shots 68 on the left side of the illustration. By time aligning on one set of sources 24, the corresponding set of shots has coherent energy while the other set of shots becomes incoherent. For example, the second source shots are fired with delays (dithers) and thus are not time aligned and have incoherent energy, as represented by second shots 70 on the right side of the illustration. The data can be separated using a suitable incoherent noise attenuation algorithm. Alternatively, the first source shots 68 may be shifted and may reflect incoherent energy, as illustrated in the example of FIG. 6. In this latter example, the second source shots are time aligned and are characterized by coherent energy. In either example, simple procedures, such as stacking, can be used to attenuate the unaligned energy.

Figure 7:
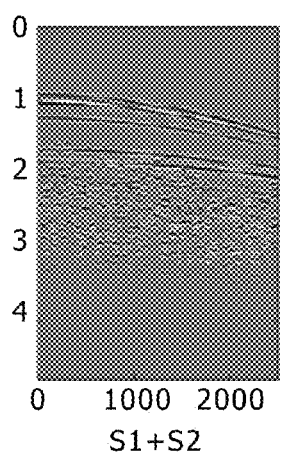
FIG. 7 is an illustration of a synthetic data example of simultaneously acquired data sets and separation by source, according to an embodiment of the present disclosure.
Figure 7:
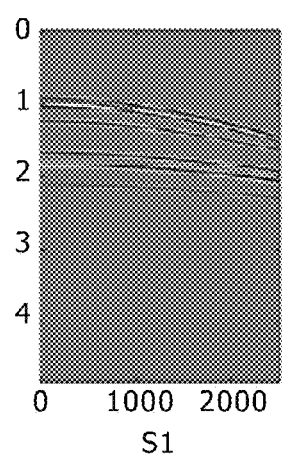
Figure 7:
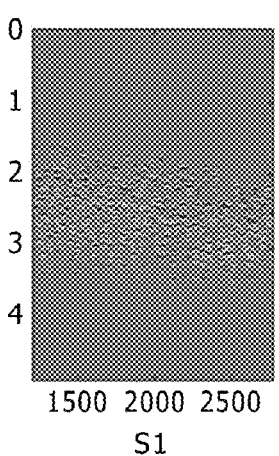

FIG. 7 provides a representation of synthetic data examples of simultaneously acquired data and the subsequent separation via the incoherency in the datasets. This incoherency also can be taken advantage of by a coherency filter to obtain an approximate decomposition of the simultaneously acquired data into its constituent single-shot files. In FIG. 7, the synthetic dataset labeled S1+S2 illustrates the data being recorded simultaneously. The synthetic dataset labeled S1 corresponds to data regarding firing of a first source 24 in which no dither is applied. The synthetic dataset labeled S2 corresponds to the dataset acquired by applying dithers on shots of a second source 24 in which the shots of second source 24 are subsequent to the initial shot.

Embodiments described herein provide examples of implementations facilitating the simultaneous or near-simultaneous firing of multiple sources 24. For example, the multiple sources 24 may be fired nearly simultaneously with dithers. The multiple sources 24 may be at single or multiple locations, and the firing of the multiple sources 24 occurs while data is acquired from the acoustic receivers 28 positioned in borehole 30. The source controller 42 may comprise a digital source controller which cooperates with GPS system 38 to provide synchronization of firing. Depending on the application, the downhole acquisition system 26 may be designed to record data "shot by shot" or continuously with firing and downhole recording being completely asynchronous. Additionally, embodiments of the source controller 42 may have the capability to synchronize the source firing with a target UTC time. While the applications described herein generally refer to a single borehole 30, the system and methodology may be applied to applications having multiple boreholes 30. In some embodiments, the acoustic signals may be provided by a combination of downhole and surface sources 24.

Figure 8:
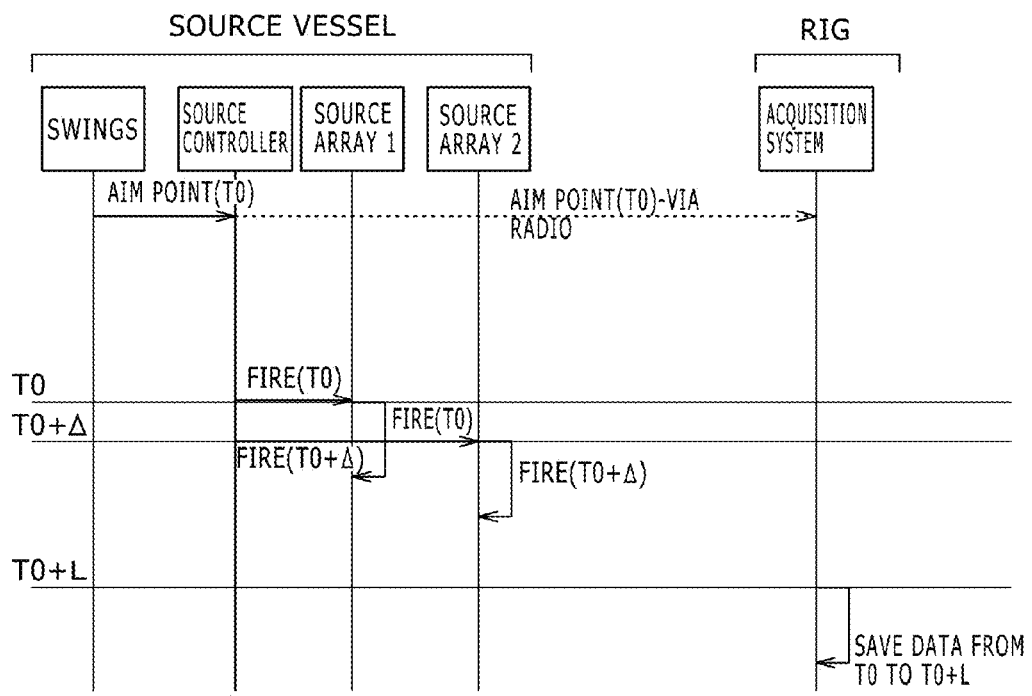
FIG. 8 is a schematic illustration showing timing associated with a single vessel configured with multiple source arrays, according to an embodiment of the present disclosure.

Referring generally to FIG. 8, a graph is provided to illustrate an embodiment in which a single source vessel 22 is utilized with multiple source arrays 24. In one configuration of this embodiment, the source vessel 22 may be operated as a master while the downhole acquisition system 26 may be operated as the slave. One example of a downhole acquisition system is the MAXIS system available from Schlumberger Corporation. The source vessel navigation system 36 is used to monitor in real time the source vessel's speed, position and direction and to estimate a future target GPS shot time (T0) for the next shot point based on its survey plan. An example of a source vessel navigation system is the SWINGS system available from Schlumberger Corporation. The navigation system 36 may be designed to digitally send the information to the source controller 42 before the shot time T0 (with a pre-defined delay on the order of a couple seconds). An example of a suitable source controller is the TRISOR system available from Schlumberger Corporation.

The source controller 42 also may be used to compute a UTC shot time Tn for each additional source 24 by adding a random dither value $\Delta n$ to T0, as illustrated in FIG. 8. Asynchronously, the source controller 42 sends T0 to the downhole acquisition system 26 via a communicative coupling, e.g. a high-speed radio system, logging cable, fiber optic cable, inductive coupling, among other communicative components including various combinations and configurations of components, before the firing time (which is a pre-defined time on the order of a couple seconds).

It should be noted that in some situations, the tow vessel 22 (or tow vessels 22) may be operated as the slave while the downhole acquisition system 26 is operated as the master. In this latter example, the downhole acquisition system 26 sends a future estimated shot time T0 to the vessel source controller 42. This can be triggered by an operator, by a periodic automatic system, or by other suitable systems. While the first source 24 uses T0 as the target shot time, the source controller 42 may be used to compute a new UTC shot time Tn by adding a dither value $\Delta n$ to T0 for each additional source/source array 24. In both options: when applying dithers, acoustic sources 24 are fired pseudo-simultaneously at times T0 to Tn while downhole data is recorded from T0 up to a predefined recording time.

Figure 9:
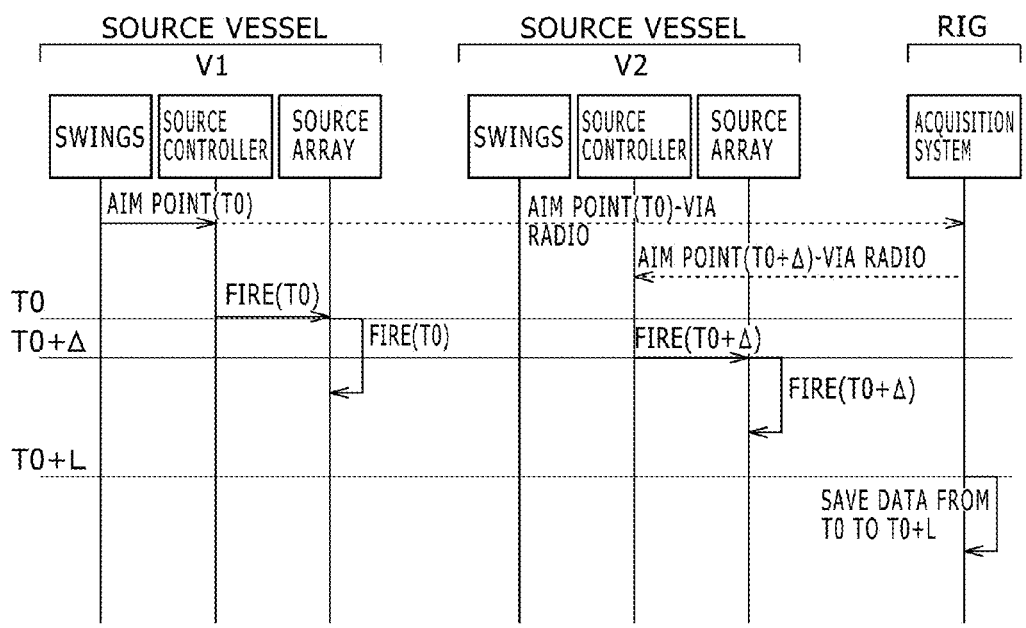
FIG. 9 is a schematic illustration showing timing associated with multiple vessels each configured with single source arrays, according to an embodiment of the present disclosure.

Referring generally to FIG. 9, a graph is provided to illustrate another embodiment in which a single source 24 is utilized on each of multiple vessels 22. In one configuration of this embodiment, one of the vessels 22 operates as the master vessel 56 while the downhole acquisition system 26 and the other vessel or vessels 22 operate as slaves. In FIG. 9, the graphically illustrated source vessel V1 represents the master vessel 56 and the graphically illustrated source vessel V2 represents the one or more slave vessels 57 in this particular example.

In some embodiments, all of the vessels 22 may have a dedicated survey plan (with pre-planned shot points) but the master source vessel (represented by V1) triggers the overall firing sequence. The navigation system 36 on source vessel V1 may again be designed to monitor in real-time the source speed, position, and vessel direction while estimating a future target GPS shot time (T0) for the next shot point. The navigation system 36 also may be designed to digitally send this information to the source controller 42, which triggers the source firing at the estimated shot time.

The source controller 42 sends the shot time T0 to the downhole acquisition system 26 via a suitable communicative coupling, e.g. a high-speed radio system, logging cable, fiber optic cable, inductive coupling, among other communicative components including various combinations and configurations of components, before the firing time (with a pre-defined delay on the order of a couple seconds). Embodiments of the downhole acquisition system 26 may be designed to, upon reception of shot time T0, compute UTC shot time Tn for each vessel 22 by adding a dither value $\Delta n$ to T0. The downhole acquisition system 26 sends the shot times to each control/processor system, e.g. processor system 46, of each vessel 22. These dither times are then used by each source controller 42 to fire the acoustic source arrays 22 at the proper pre-set time.

In other situations, however, embodiments of the source controller 42 disposed on the master source vessel 22 (V1) also may send shot time T0 directly to the other source vessels 22 (V2 to Vn). Each source controller 42 then locally computes its shot time Tn by adding a random dither value $\Delta n$ to T0. Alternatively, the master vessel system can be used to compute the individual time Tn before sending it to the slave source vessels 22. In either case, shot time T0 also is used by the downhole acquisition system 26 to record the data from the downhole sensors, e.g. acoustic receivers 28. It should be noted that in alternate embodiments multiple vessels may each utilize multiple sources 24 to provide simultaneous or near-simultaneous acquisition around one or more boreholes 30. For example, the multiple vessels may utilize multiple sources 24 while still employing a dither, as described above.

Figure 10:
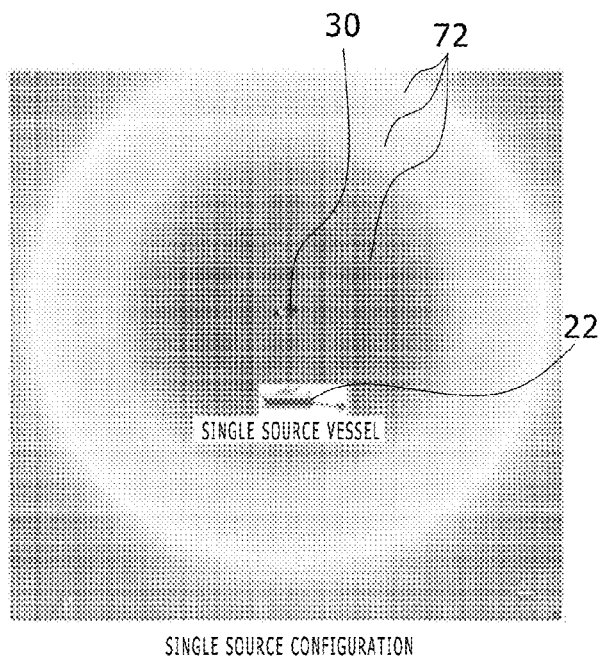
FIG. 10 is a schematic illustration showing use of a single vessel in a seismic imaging application in which the vessel moves in a spiral pattern around a borehole, according to an embodiment of the present disclosure.
Figure 11:
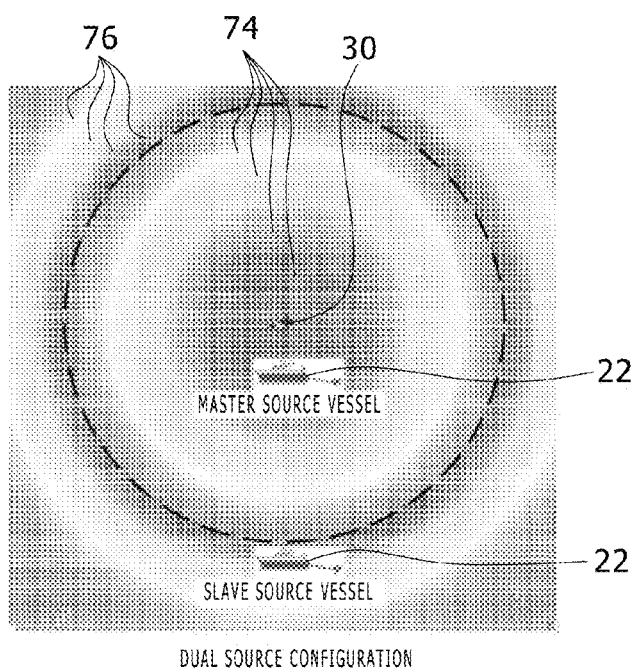
FIG. 11 is a schematic illustration showing use of a plurality of vessels in a seismic imaging application in which the vessels move in a spiral pattern around a borehole, according to an embodiment of the present disclosure.

As illustrated in FIGS. 10 and 11, the one or more tow vessels 22 may be operated in a circular pattern around rig 50 and borehole 30 to gain efficiency by avoiding the need to turn the vessel around at the end of each seismic line. By way of example, the one or more vessels 22 may be run in a spiral pattern around the rig 50 and the borehole 30. In the example illustrated graphically in FIG. 10, a single vessel 22 is operated in a predetermined pattern defined by a set of rings 72 around borehole 30.

However, in the example illustrated in FIG. 11, a plurality of vessels 22 is operated in predetermined patterns defined by corresponding sets of rings 74 and 76, respectively. It should be noted that two sets of rings 74, 76, e.g. spiraling rings, are illustrated in FIG. 11 and that additional vessels 22 can be used to create additional sets of generally concentric rings. It should be noted that the rings of FIGS. 10 and 11 also can be representative of a grid like land pattern broken into a ring system. The use of a stationary source, similar to the rig source 24, enables application of the present system and methodology to land applications as well as marine applications.

Three-dimensional vertical seismic profiling performed according to the various embodiments described above can be acquired with greater efficiency by using multiple sources shooting simultaneously in rings, as represented graphically in FIG. 11. By way of example, the acquisition survey may be divided equally among the vessels 22 such that one vessel 22 acquires the innermost set of shots, a second vessel 22 acquires the next outermost set of shots, and so forth. Because the vessels 22 shoot the seismic sources 24 at nearly the same time, the recorded traces are a sum of data from the shots taken by the multiple vessels. The summed traces may be replicated at the respective shot locations and used in modified processing flows.

The three-dimensional vertical seismic profiling surveys are acquired more efficiently if the acquisition is performed using multiple sources 24 that shoot simultaneously or are dithered in time, as described above. According to one embodiment, the acquisition survey is divided into as many sets of rings, e.g. sets of rings 74, 76, as there are sources 24. The innermost ring set may be acquired by the first source 24, the next ring set may be acquired by the second source 24, and so forth. The ring sets may have various shapes and sizes, but one embodiment utilizes a spiral form to facilitate offshore spiral surveys utilizing two or more sources. Effectively, the survey is divided into offset ranges such that a source 24 acquires data only in the offset range attributed to it. Furthermore, all of the sources 24 shoot more or less at the same time because the acquisition of the multiple sources can either be simultaneous or dithered in time. The same approach also can be utilized in three-dimensional land surveys by dividing the sources into offset rings.

Because the shots are taken simultaneously or nearly simultaneously, the recorded data is the sum of contributions from all of the sources 24. The recorded data from the sum of sources may be replicated at the corresponding shot locations in one simple processing scheme. According to that scheme, data from multiple sources 24 may be migrated using standard imaging algorithms. The created image may then be deconvolved using, for example, a corridor stack to obtain the final image. In a second processing scheme, existing three component processing flows are extended to separate sources prior to imaging the multiple source data.

Figure 12:
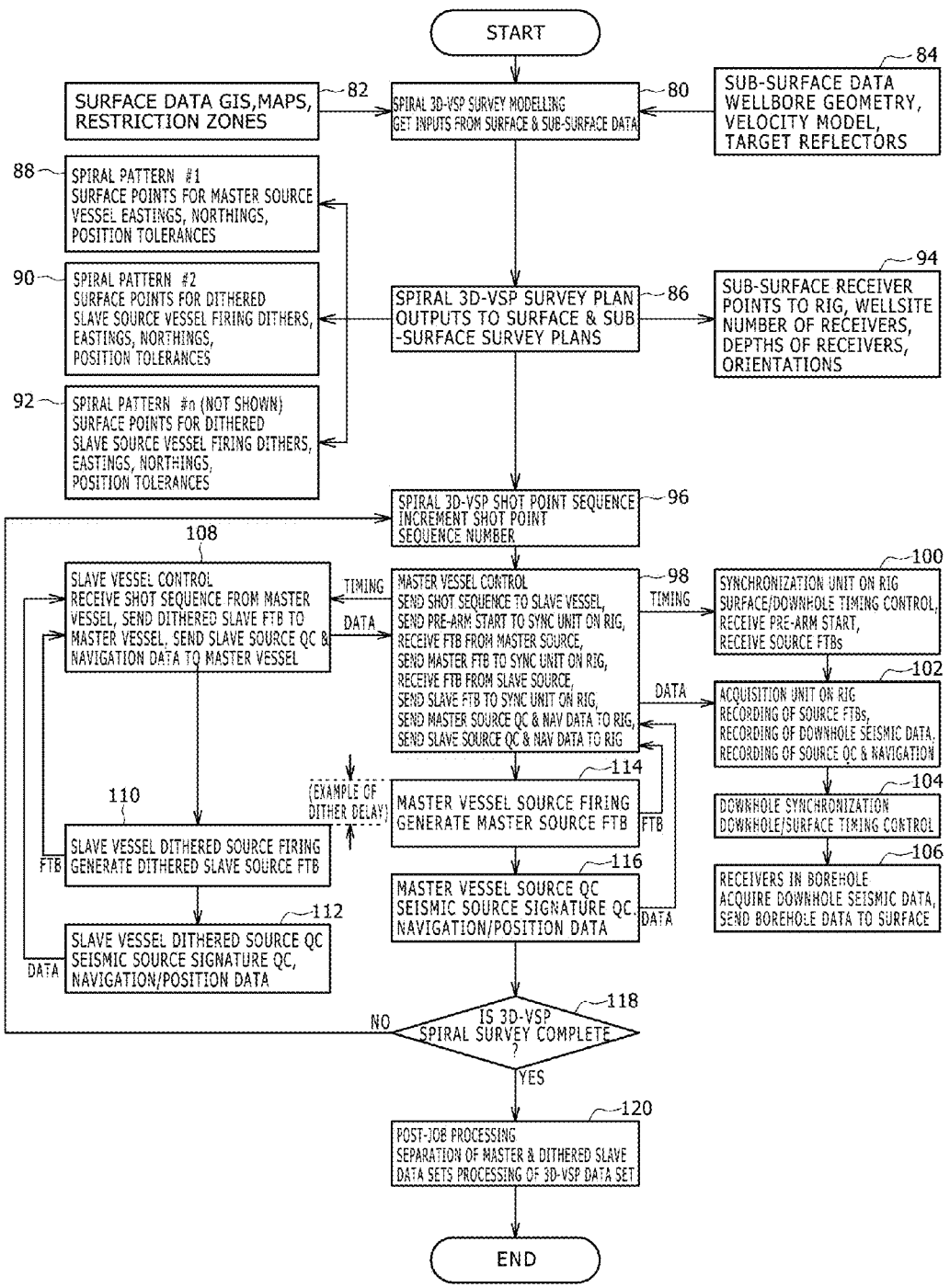
FIG. 12 is a flowchart illustrating one example of a methodology for implementing simultaneous or near-simultaneous acquisition while synchronizing sources with a downhole acquisition system, according to an embodiment of the present disclosure.

Referring generally to the flowchart of FIG. 12, an example of a methodology for carrying out simultaneous or near-simultaneous acquisition is illustrated and demonstrates synchronization of sources 24 with the downhole acquisition system 26. In this example, a survey modeling technique is initially established, as indicated by block 80. The specific technique may vary according to the parameters of a given environment and application, however one survey modeling technique comprises spiral three-dimensional vertical seismic profiling. Regardless of the specific technique, inputs are obtained based on surface and subsurface data. Examples of surface data include geographic information systems (GIS), maps, and restriction zones, as represented by block 82. Examples of subsurface data include wellbore geometry, velocity models, and target reflectors, as represented by block 84.

Once the survey modeling technique is selected and the data obtained, an overall survey plan is determined and appropriate surface and subsurface survey plans are output, as indicated by block 86. By way of specific example, the survey plan may comprise a spiral three-dimensional vertical seismic profiling survey plan. The surface survey plan may comprise a variety of sub-survey plans, as represented by blocks 88, 90 and 92, respectively. For example, the sub-survey plan 88 may comprise establishing a desired spiral pattern with selected surface points for the master source vessel 22 and may include suitable Eastings, Northings, and position tolerances. The sub-survey plan 90 may comprise establishing a desired spiral pattern with selected surface points for the dithered slave source vessel 22 and may include suitable firing dithers, Eastings, Northings, and position tolerances. In this example, the sub-survey plan 92 may comprise establishing an additional spiral pattern or patterns with selected surface points for an additional dithered slave source vessel or vessels.

In this embodiment, the subsurface survey plan establishes subsurface receiver points with respect to the rig 50 and the wellsite, as represented by block 94. The subsurface survey plan may be used to establish the number of receivers, depths of receivers, orientations, and other desired parameters related to subsurface components. It should be noted that the survey modeling 80 and the survey plan 86 can be adjusted for the different types of seismic acquisition described herein other than spiral three-dimensional vertical seismic profiling.

In the example illustrated in FIG. 12, a shot point sequence, e.g. a spiral three-dimensional vertical seismic profiling shot point sequence, is subsequently determined, as indicated by block 96. An incremental shot point sequence number is delivered to a master vessel control, as indicated by block 98. At this stage, the master vessel control may be used to perform a variety of functions including sending the shot sequence to the slave vessel 22; sending a pre-arm start to synchronize the control/processing equipment on rig 50; receiving measure of the source/air gun firing, e.g. field time break (FTB), from the master source; sending master FTB to the synchronization unit 44 on the rig 50; receiving FTB from the slave source; sending slave FTB to the synchronization unit 44 on the rig 50; sending master source quality control and navigation data to the rig 50; and sending slave source quality control and navigation data to the rig 50.

As indicated by block 100, the master vessel control effectively controls the timing signal/data sent to the synchronization unit 44, which may be located on the rig 50. By way of example, the signal may be used to control surface/downhole timing, to receive the pre-arm start, and to receive source FTBs. The master vessel control also may be utilized to provide data to an acquisition unit that may be located on rig 50, as indicated by block 102. The data may be related to recording source FTBs, recording downhole seismic data, and recording source quality control and navigation.

The acquisition unit may be used to control downhole synchronization, as represented by block 104, so as to synchronize surface sources with the downhole acquisition system, e.g. downhole data acquisition system 26. For example, the downhole synchronization control may be used to synchronize receivers 28 located in the borehole, as indicated by block 106. The receivers 28 acquire downhole seismic data and send borehole data to the surface. As indicated in FIG. 12, the borehole data may be sent uphole to the acquisition unit on the rig 50 (see block 102).

The master vessel control also may be used to provide timing inputs to the slave vessel control, as indicated by block 108. The slave vessel control may perform a variety of functions, such as receiving the shot sequence from the master vessel; sending dithered slave FTB to the master vessel; and sending slave source quality control and navigation data to the master vessel. The slave vessel control also may be used to control the slave vessel dithered source firing, as represented by block 110, thus generating dithered slave source FTB. The dithered slave source FTB is provided back to the slave vessel control, as indicated in FIG. 12. The slave vessel control further may be used to control the slave vessel dithered source quality control, as represented by block 112. The seismic source signature quality control and navigation/position data may be provided back to the slave vessel control, as further indicated in FIG. 12.

The master vessel control also may be used to control the master vessel source firing, as indicated by block 114. The generated master source FTB may be provided back to the master vessel control, as indicated in FIG. 12. The master vessel control also may be used to control the master vessel source quality control, as indicated by block 116. Seismic source signature quality control data and navigation/position data may be provided back to the master vessel control, as again indicated in FIG. 12.

After the shot sequence at a given location, the processing system, e.g. processing system 46, determines whether the survey is complete as indicated by decision block 118. If the survey is not complete, the process is returned to block 96 and the system is designed to increment to the next shot point sequence number. This iterative process is continued until the survey is completed. Once completed, post job processing is performed, as indicated by block 120. Post job processing may include many types of functions, including further processing of data. For example, post job processing may include separating the master and dithered slave data sets and processing the seismic profiling data set, e.g. processing the three-dimensional vertical seismic profiling data set.

The methodology described above with reference to FIG. 12 is one approach to improving seismic surveys through synchronization of the sources with the downhole acquisition system. Although the approach illustrated in FIG. 12 references spiral three-dimensional vertical seismic profiling, the approach can be adjusted for use with other simultaneous or near-simultaneous acquisition methods, such as other embodiments described herein. Furthermore, the processing systems, surface equipment, downhole equipment, and other components/systems of the overall survey system 20 may be adapted, changed or substituted to accommodate the specific characteristics and parameters of a given seismic acquisition job. For example, the methodology may be carried out with the downhole processing equipment 58 and the surface processing equipment 59 described above or with other types of equipment and systems for relaying, controlling, and processing data.

In general, the various systems, components, and methodology described above may be adjusted to accommodate the particular parameters of many survey environments, including marine and land environments. In many vertical seismic profiling applications, two or more vessels are employed with each vessel towing one or more sources. However, one or more of the tow vessels can be replaced with the rig, a downhole structure, or another suitable source location.

In some applications, the use of dithers between firings enables separation of signals when processed via, for example, processing system 46. In other words, one signal can be processed while the other signal is treated as noise. As discussed above, one or more additional acoustic receivers, e.g. a receiver placed below the rig 50, also can be employed to help determine noise/ghosts in the data. Furthermore, the vertical seismic profile survey may be performed during a drilling operation. For example, the shots/firing from the sources 24 can be controlled so that the shots/firing occur during stoppage of drilling, e.g. stoppage of drilling during attachment of each sequential section of drill pipe.

Although only a few embodiments of the present disclosure have been described in detail above, those of ordinary skill in the art will readily appreciate that many modifications are possible without materially departing from the teachings of this invention. Accordingly, such modifications are intended to be included within the scope of this disclosure as defined in the claims.

What is claimed is:

1. A system of performing three-dimensional vertical seismic profiling comprising:
    a vessel comprising:
        two or more source arrays configured to generate acoustic source signals;
    a downhole acquisition system comprising acoustic receivers configured to receive the source signals and to generate data streams;
    a navigation system to determine a real time speed, position, and direction of the vessel and to estimate an initial shot time;
    a source controller to control firing of acoustic source signals in which timing of an additional shot time is based on the initial shot time plus an offset and a dither value;
    a synchronization unit to coordinate the firing of dithered acoustic signals with recording by the downhole acquisition system; and
    a processor to separate a data stream of the initial shot and a data stream of the additional shot via a coherency filter.

2. The system as recited in claim 1, wherein the vessel comprises two or more vessels.

3. The system as recited in claim 2, wherein the two or more vessels travel along a marine surface in spiral rings around the downhole acquisition system.

4. The system as recited in claim 1, wherein the navigation system comprises a global positioning system; and a coordinated universal time system.

5. The system as recited in claim 1, wherein the dither is positive.

6. The system as recited in claim 1, wherein the dither is negative.

7. The system as recited in claim 1, wherein the downhole acquisition system comprises a plurality of the acoustic receivers located in a subsea borehole.

8. The system as recited in claim 7, wherein the downhole acquisition system further comprises an additional acoustic receiver located outside the borehole to facilitate removal of signal noise.

9. A method of performing seismic profiling comprising:
deploying one or more acoustic receivers in a borehole;
deploying a vessel configured with a first source configured to generate an acoustic signal;
generating another acoustic signal from a second source;
controlling firing of the first and second sources with a source controller;
operatively coupling a synchronization unit with the first and second sources and the one or more acoustic receivers; and
synchronizing firing of the first and second sources via the source controller and the synchronization unit such that timing of one source is offset from the other source by an amount equal to an offset and a dithered value with respect to the other source and the firing of the first and second sources is coordinated with recording by the acoustic receivers.

10. The method as recited in claim 9, further comprising deploying a second vessel having the second source to generate an acoustic signal.

11. The method as recited in claim 10, further comprising using the vessel as a master vessel and the second vessel as a slave vessel towing the second source, and employing the second source to shoot with the offset and the dithered value.

12. The method as recited in claim 10, further comprising deploying at least one source on a rig; and utilizing at least one of the first and second vessels as slave vessels.

13. The method as recited in claim 10, further comprising using the vessel and the second vessel to tow the first and second sources in a ring pattern around the borehole.

14. The method as recited in claim 10, further comprising using the vessel and the second vessel to tow the first and second sources in a spiral pattern around the borehole.

15. The method as recited in claim 10, wherein deploying the vessel and deploying the second vessel comprises using the vessel and the second vessel to each tow a plurality of source arrays.

16. The method as recited in claim 10, wherein deploying two or more vessels comprises deploying at least one of vessels in the form of a rig with a rig source array.

17. The method as recited in claim 9, further comprising locating the second source on a rig.

\* \* \* \* \*